(12) United States Patent
Yang et al.

(10) Patent No.: US 7,385,978 B1
(45) Date of Patent: Jun. 10, 2008

(54) METHOD AND APPARATUS FOR RELIABLE MULTICAST DISTRIBUTION

(75) Inventors: Zheng Yang, Fremont, CA (US); Dan Li, Sunnyvale, CA (US); Shanchi Zhan, Sunnyvale, CA (US); Kenneth Mueller, II, Santa Barbara, CA (US)

(73) Assignee: Cisco Technology, Inc., San Jose, CA (US)

( * ) Notice: Subject to any disclaimer, the term of this patent is extended or adjusted under 35 U.S.C. 154(b) by 834 days.

(21) Appl. No.: 10/782,649

(22) Filed: Feb. 19, 2004

(51) Int. Cl.
*H04L 12/28* (2006.01)
(52) U.S. Cl. ..................... 370/390; 370/473
(58) Field of Classification Search ............ None
See application file for complete search history.

(56) References Cited

U.S. PATENT DOCUMENTS 6,247,059 B1 * 6/2001 Johnson et al. ............. 709/237

* cited by examiner

*Primary Examiner*—Robert W. Wilson
(74) *Attorney, Agent, or Firm*—Barry W. Chapin, Esq.; Chapin IP Law, LLC

(57) ABSTRACT

A system for reliable multicast distribution includes a primary content engine and a backup content engine sender. The primary content engine sender sends out a multicast message of content to selected content engine receivers. The sender waits for negative acknowledgments from the selected content engine receivers declaring that content was not received. If a negative acknowledgment is received, the sender resends the multicast message a predetermined number of times. If the content is still not received after the number of multicast passes is exhausted, the sender sends out unicast messages to those receivers still requesting content. If the primary sender does not respond to a negative acknowledgment, the receiver sends a second negative acknowledgment to the backup multicast sender. The backup responds with the data requested in the negative acknowledgment and so is able to begin data distribution at the point where the primary sender left off without maintaining synchronicity with the primary sender.

24 Claims, 6 Drawing Sheets

METHOD AND APPARATUS FOR RELIABLE MULTICAST DISTRIBUTION

BACKGROUND OF THE INVENTION

Computer networks such as the Internet allow computer systems to exchange content (e.g., data or information such as documents, web pages, files, database information, streams of audio and/or video data, or the like) in a variety of ways. For example, computer systems (e.g., client computer systems, server computer systems) exchange content over the computer network by using a suite of protocols collectively referred to as the World. Wide. Web. In a typical operation of the World. Wide. Web, a client computer system, configured with a web browser, requests content served by a web server computer system over the Internet. The web server transmits the requested content over the Internet to the requesting client computer system.

Client computer systems that require the ability to access content using the aforementioned techniques may be connected to a computer network at diverse geographic locations. In such situations, a producer, provider or other originator of the content may use a group of technologies, collectively called a content distribution network (CDN), to disseminate or distribute the content.

A CDN enables web content from an origin server to be distributed to other servers at various locations in the network for storage and access. A CDN typically includes a content distribution manager (CDM) to manage the CDN, at least one content router (e.g., operating as a load balancer) and one or more content engines that operate as servers (e.g., web servers) to serve content requested by content requests sent from client computer systems. The content router receives client requests for content, and using various content routing techniques, decides which content engine is to service those client requests. The content router then redirects the client requests to an appropriate content engine. The content engines are also called content servers, or alternatively, caching servers. A content engine that receives redirected requests from a client computer system typically operates to serve the requested content back to those client computer systems, though the content engine may perform further redirection techniques as well in some instances.

When a user requests a. Web page, for example, that is part of the CDN, the CDN typically redirects the request from the origin server to a content engine that is closest to the user. This redirection may be based on a number of factors such as the geographic proximity of the requesting client to an available content engine containing the requested content, or on the specific content requested, or on load balancing considerations between multiple available content engines. The content engine delivers the cached content to the user. The CDN also communicates with the origin server to deliver any content that has not been previously cached. Thus, the CDN accelerates access to content on behalf of client computer systems.

Various conventional techniques and mechanisms also exist for distributing the content from the origin server to the selection of content engines distributed through the computer network in order to accelerate access to the content by client computer systems. One technique for distributing content is the content channel. A content provider defines one or more "channels" to make content available through the CDN. Each channel contains a set of files that is typically expected to be accessed by the same set of users.

For example, a channel may contain training videos intended to be used by sales people, or advertisements directed at an organization's customers. A subset of the content servers in the CDN is assigned to each channel. The content servers in the assigned subset are typically servers located conveniently with respect to the intended set of users of the channel.

Files in a channel are pre-positioned at the content servers assigned to that channel. Pre-positioning enables greater certainty of availability of the content to accessing users. The content servers assigned to the channel may be behind a slow link relative to the origin server, and the files themselves may be very large. Therefore, moving the content from the origin server to a content engine assigned to the channel can be time-consuming. Pre-positioning the content generally reduces delay when users attempt to access files. Pre-positioning content within content engines is especially important when the content is very large or in situations where there is a low speed connection between the origin server and the content engine that will cache or otherwise store the content for access by requesting client computer systems. By pre-positioning the content, client computer systems encounter minimal delays when requesting the content from the content engines.

Routing within the CDN may be further accelerated by creating an overlay network. An overlay network includes a collection of nodes placed at strategic locations in an existing network fabric, also referred to as a substrate network. The overlay network further includes specified connections between the nodes in the collection of nodes. Together the collection of nodes and the specified connections implement a network abstraction on top of the substrate network. Routing is accelerated by selecting optimal nodes and connections. In a CDN, the overlay network includes the content engines and connections between the content engines. The connections are selected in order to optimize data transfer between the content engines.

In some cases, the overlay network includes multicast connections in which content is delivered from one server in the CDN to many content servers using multicast distribution. In multicast distribution, a single message containing content is transmitted to a select group of receiver content engines. Multicasting accelerates distribution of content in the CDN and accordingly accelerates access to content by clients.

SUMMARY OF THE INVENTION

Conventional multicast data distribution technology in networks does not provide efficient fail-over and failure recovery techniques. For example, one conventional multicast content distribution system fails over to unicast content distribution. In order to retain efficient distribution of data, fail-over to multicast is preferred followed by fail-over to unicast distribution if the multicast failover is not successful. Unicast distribution is typically slower than multicast distribution.

In another conventional system, a multicast content engine sender transmits content repeatedly at predetermined intervals to ensure the delivery of the content. The system is configured for multiple multicast distributions of the same content. That is, a multicast content engine sender transmits content repeatedly at predetermined intervals to ensure the delivery of the content. The system is inefficient in its use of bandwidth in those cases where the content engine receivers have received the multicast content prior to completion of a preset number of multicast passes. After the preset passes are exhausted and content is not fully delivered, the system fails over to unicast distribution. Fail-over to unicast prior to exhausting multicast passes, however, is to be avoided because of the diminished efficiency of unicast distribution as compared to multicast distribution.

In another conventional system, the multicast content engine sender receives acknowledgments from the receiver content engines that the receiver content engines have received the content. The sender content engine maintains the acknowledgements and continues multicasting until all the content engine receivers have positively acknowledged receiving the content. In this system, the sender content engine needs to maintain state of all the receivers as well as all the files of interest, which is cumbersome and difficult to scale.

Further in conventional technology, the content engine receiver is, in certain cases, not aware that there are additional multicast passes remaining in which the content engine receiver may successfully receive content. Multicast distribution passes are typically scheduled to occur hours apart. In these cases, the content engine receiver, having failed to receive expected content, fails-over to unicast distribution and requests content from its unicast sender. The unicast sender is generally a different content engine from the multicast sender. This results in additional unnecessary traffic in the CDN as the multicast passes will occur even if the content engine receiver receives the content from the unicast sender.

It is preferable that the system fails over to a backup content engine sender upon failure of the primary content engine sender. In one conventional CDN, the primary content engine sender and backup content engine sender are synchronized with a full content distribution status at startup. The primary and backup engines then communicate changes in distribution status during operation. This constant and full synchronization of distribution state between the primary and backup multicast senders is error-prone and expensive. Constant synchronization is costly due to substantial database operations, maintenance of state via applying changes to distribution status, as well as the frequent message exchange between the primary and backup content engines.

Embodiments of the present invention significantly overcome such deficiencies and provide mechanisms and techniques for reliable multicast distribution in a CDN. More specifically, embodiments of the invention provide methods and apparatus that provide intelligent multicasting and backup multicast sender activated by content receivers. A primary content engine sender sends out a multicast message of content to selected content engine receivers. The sender waits for negative acknowledgments from the selected content engine receivers declaring that content was not received. If a negative acknowledgment is received, the sender resends the multicast message a predetermined number of times. If the content is still not received after the number of multicast passes is exhausted, the sender sends out unicast messages to those receivers still requesting content. The intelligent multicast system increases efficiency over existing systems because if the first multicast message is successful, multicast distribution does not continue. Further, the failover to unicast occurs after more efficient multicast attempts to deliver data.

The present system further provides a backup multicast sender activated by content receivers and further that does not need to be synchronized with the primary sender. If the primary sender does not respond to a negative acknowledgment, the receiver sends a second negative acknowledgment to the backup multicast sender. The backup responds with the data requested in the negative acknowledgment and so is able to begin data distribution at the point where the primary sender left off without maintaining synchronicity with the primary sender.

One method embodiment a computerized device sends a multicast message to a plurality of content engine receivers. The multicast message includes content to be distributed among the plurality of content engine receivers. The computerized device waits a predetermined period for a negative acknowledgment message from at least one of the plurality of content engine receivers. If a negative acknowledgment message is received from at least one of the plurality of content engine receivers before expiration of the predetermined period, the computerized device then resends the multicast message a predetermined number of times. The computerized device provides intelligent multicasting where a multicast message is not resent if the selected receivers have all received the data in a first pass.

In a further embodiment of the computerized device, the computerized device receives a second negative acknowledgment message from one of the plurality of content engine receivers after resending the multicast message the predetermined number of times. The computerized device then sends a unicast message of content to be distributed in response to the second negative acknowledgment message to the one content engine receiver. The system fails over to unicast distribution after exhausting the more-efficient multicast distribution.

In another embodiment of the invention, the computerized device receives a negative acknowledgment message from one of the plurality of content engine receivers after the predetermined period has expired. The computerized device then sends a unicast message of content to be distributed to the one content engine receiver in response to the negative acknowledgment message received after the predetermined period has expired. The system delays unicast distribution in order to avoid premature fail-over from multicast distribution.

In another embodiment of the invention, the computerized device sends the multicast message in response to a negative acknowledgment message from at least one of the plurality of content engine receivers. The content engine receivers provide the trigger for further multicast distribution.

In another embodiment of the invention, the computerized device contacts a primary content engine sender before sending the multicast message. The computerized device sends the multicast message to the plurality of content engine receivers if the primary content engine does not respond after being contacted. The computerized device then disregards the negative acknowledgment if the primary content engine does respond after being contacted. The computerized device in this embodiment is a backup sender triggered by a content engine receiver. In order to avoid premature failover to the backup sender, the backup sender first verifies that the primary sender is not operating.

In another embodiment of the invention, the negative acknowledgment includes a request for at least one file not received in the multicast message. The computerized device then resends only the at least one file requested in the negative acknowledgment. The backup sender is able to respond to the content receiver request without having to be synchronized with the primary sender.

In another embodiment of the invention, a plurality of negative acknowledgments are received during the predetermined period where each negative acknowledgment includes a request for at least one file not received in the multicast message. The computerized device then aggregates the files requested in the plurality of negative acknowledgments. The computerized device then resends the multicast message including the aggregated files. The content sender is able combine requests for content contained in the negative acknowledgments from the various content engine receivers into a single multicast message.

In another embodiment of the invention, the multicast message includes a plurality of files. Each file in the multicast message has an associated count value where the associated count value indicates the number of times the file has been transmitted by the computerized device. The computerized device increments the associated count value each time the computerized device transmits a file. The multicast passes are associated with individual files.

In another embodiment of the invention, the negative acknowledgment from the receiver device includes a request for at least one file not received in the multicast message. The computerized device then resends the at least one file until the associated count for the at least one file equals the predetermined number. The multicast passes are associated with individual files.

In another embodiment of the invention, a computerized device distributes content in a content distribution network by receiving a negative acknowledgment message from one of a plurality of content engine receivers. The computerized device then checks a primary content engine sender for status. If the primary content engine sender is active, the computerized device disregards the negative acknowledgment message. If a second negative acknowledgment message is received, the computerized device sends a network alert. If the primary content engine sender is inactive, the computerized device sends a multicast message to the plurality of content engine receivers in response to the negative acknowledgment message. A backup sender takes over after verifying that the primary sender is inactive to avoid premature fail-over. If the primary sender is active, the backup sender provides a network error alert.

In another embodiment of the invention, a computerized device stores and maintains distributed content in a content distributed network by scanning the distributed content stored on the computerized device. If the computerized device finds that there are missing files during the scanning step, the computerized device sends a negative acknowledgment message to a primary content sender requesting the missing files. If a response to the negative acknowledgment is not received from the primary content sender, the computerized device sends the negative acknowledgment message to a secondary content sender thereby triggering a backup system. A receiver content engine according to the invention maintains content and also maintains the status of content distribution in the content distributed network.

BRIEF DESCRIPTION OF THE DRAWINGS

The foregoing and other objects, features and advantages of the invention will be apparent from the following description of particular embodiments of the invention, as illustrated in the accompanying drawings in which like reference characters refer to the same parts throughout the different views.

DETAILED DESCRIPTION

In a content distributed network, a primary content engine sender sends out a multicast message of content to selected content engine receivers. The sender waits for negative acknowledgments from the selected content engine receivers declaring that content was not received. If a negative acknowledgment is received, the sender resends the multicast message a predetermined number of times. If the content is still not received after the number of multicast passes is exhausted, the sender sends out unicast messages to those receivers still requesting content. The content distributed network further includes a backup multicast sender activated by content receivers. The backup multicast sender does not need to be synchronized with the primary sender. If the primary sender does not respond to a negative acknowledgment, the receiver sends a second negative acknowledgment to the backup multicast sender. The backup responds with the data requested in the negative acknowledgment and so is able to begin data distribution at the point where the primary sender left off without maintaining synchronicity with the primary sender.

Figure 1:
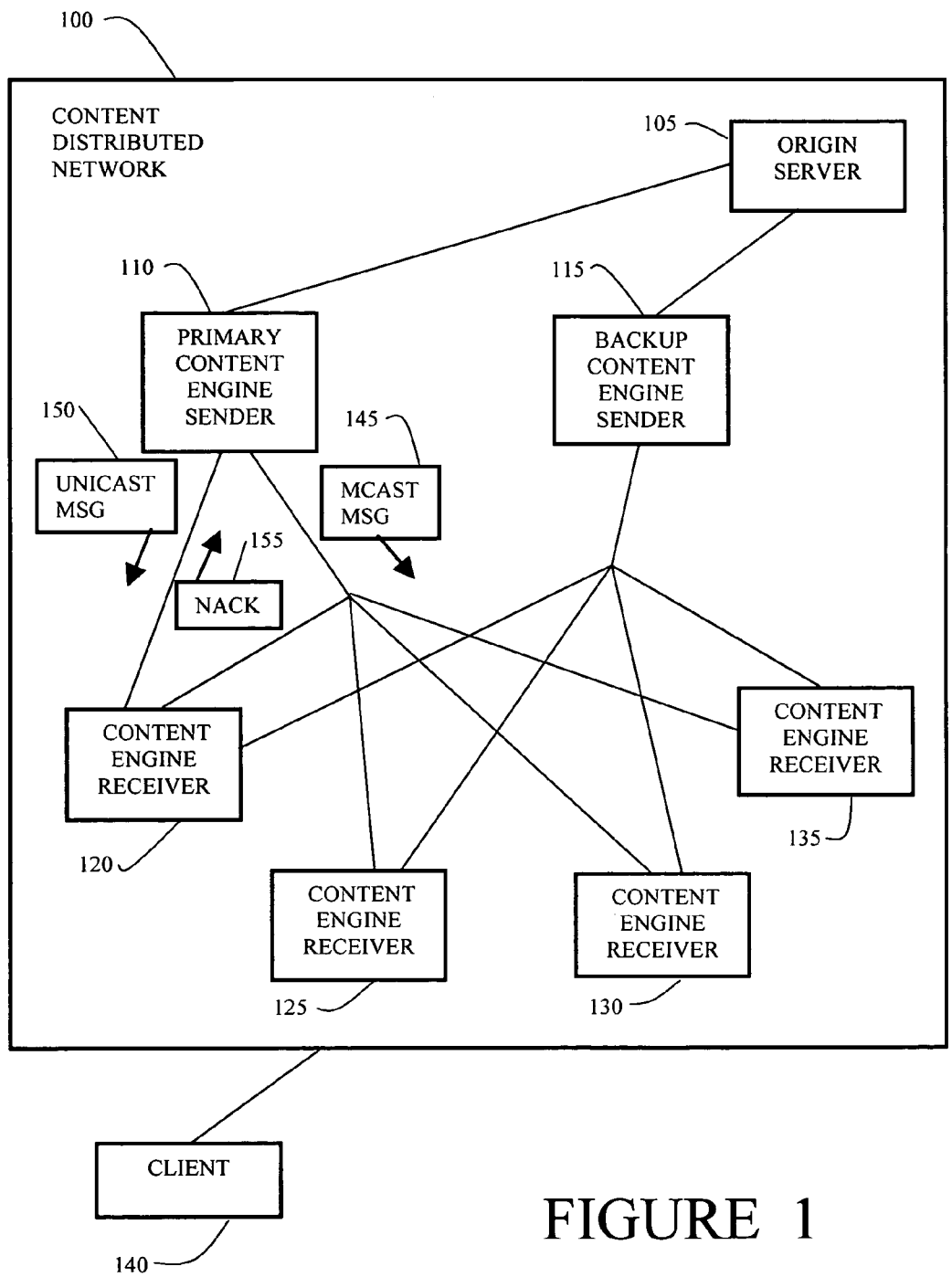
FIG. 1 is a block diagram of a content distributed network suitable for operating with the present invention.

FIG. 1 shows an example of a content distributed network (CDN) 100 having integrated multicast and unicast channel routing implementing intelligent multicasting according to principles of the invention. The CDN 100 includes an origin server 105 providing content be served to the client 140 from the CDN 100. The CDN further includes a plurality of content engines to store content from the origin server 105. The CDN 100 has a primary content engine sender 110, a backup content engine sender 115 and a plurality of content engine receivers 120, 125, 130, 135. The CDN 100 shown in FIG. 1 is merely exemplary. For example, CDNs typically have many more content engine receivers. Further, the connections between servers in the CDN 100 are merely an exemplary subset of connections presented to illustrate the invention. Still further, CDNs typically have many content engine senders, each sender having associated content engine receivers. A content engine sender and the associated content engine receivers are also referred to as a "multicast cloud." Accordingly, the content engines 110, 115, 120, 125, 130, 135 in FIG. 1 are collectively a multicast cloud.

In operation, each multicast cloud according to the present invention has only one active content engine sender in order to avoid "race" conditions in which two or more content engine senders are multicasting content to the content engine receivers 120, 125, 130, 135. Accordingly, in operation, the CDN 100 has only one active content engine sender, the primary content engine sender 110. The primary content engine sender 110 and backup content engine sender 115 use the same multicast advertisement address in order to multicast to the content engine receivers 120, 125, 130, 135.

The primary content engine sender 110 distributes content to the content engine receivers 120, 125, 130, 135 by transmitting a multicast message 145. Each content engine receiver 120, 125, 130, 135 periodically reviewed its stored content and sends a message to the primary content engine sender 110 if objects such as files are discovered to be absent from the stored content. The message sent by the content engine receiver, for example content engine receiver 120, to the primary content engine sender 110 is called a negative acknowledgment 155, or "NACK". Typically the NACK 155 is highly compressed. Various ways of identifying files in a compressed manner may be used including using a channel identifier. The invention is not limited to a particular compression technique.

When the primary content engine sender 110 receives a NACK 155, the primary content engine sender 110 resends the multicast message 145 in response. The primary content engine sender 110 includes in the multicast message 145 the missing content reported by the content engine receiver 120 in the NACK 155. The primary content engine sender 110 resends the multicast message 145 a predetermined number of times.

If after the predetermined number of multicast resends is exhausted and the content engine receiver 120 still has not received the content, the primary content engine sender 110 transmits a unicast message 150 including missing content to the content engine receiver 120.

The CDN 100 includes a secondary multicast sender, the backup content engine sender 115. As described above, the backup content engine sender 115 uses the same advertisement address configured for the primary content engine sender 110. The backup content engine sender 115 is activated when the primary content engine sender 110 fails to respond to a NACK 155. If the content engine receiver 120 fails to get a response to a NACK 155 from the primary content engine sender, the content engine receiver 120 resends the NACK 155 but addressed to the backup content engine sender 115. The backup content engine sender 115 verifies that the primary content engine sender 110 is not operating before becoming active as a sender. If the primary content engine sender 110 is inactive, the backup content engine sender 115 responds to the NACK 155 with a multicast message including the content requested in the NACK 155. The backup content engine sender 115, after becoming active, checks the primary content engine sender 110 periodically. When the primary content engine sender 110 revives, the backup content engine sender 115 stops sending content.

The primary content engine sender 110 checks the backup sender 115 during start-up to see if the backup sender 115 is alive and actively serving content. The primary content engine sender 110 delays sending any content for a short period if the backup sender 115 is active in order to enable the backup sender 115 to finish on-going jobs. The backup sender 115 does not respond to the primary sender 110, the primary sender 110 begins sending content without delay.

Figure 2:
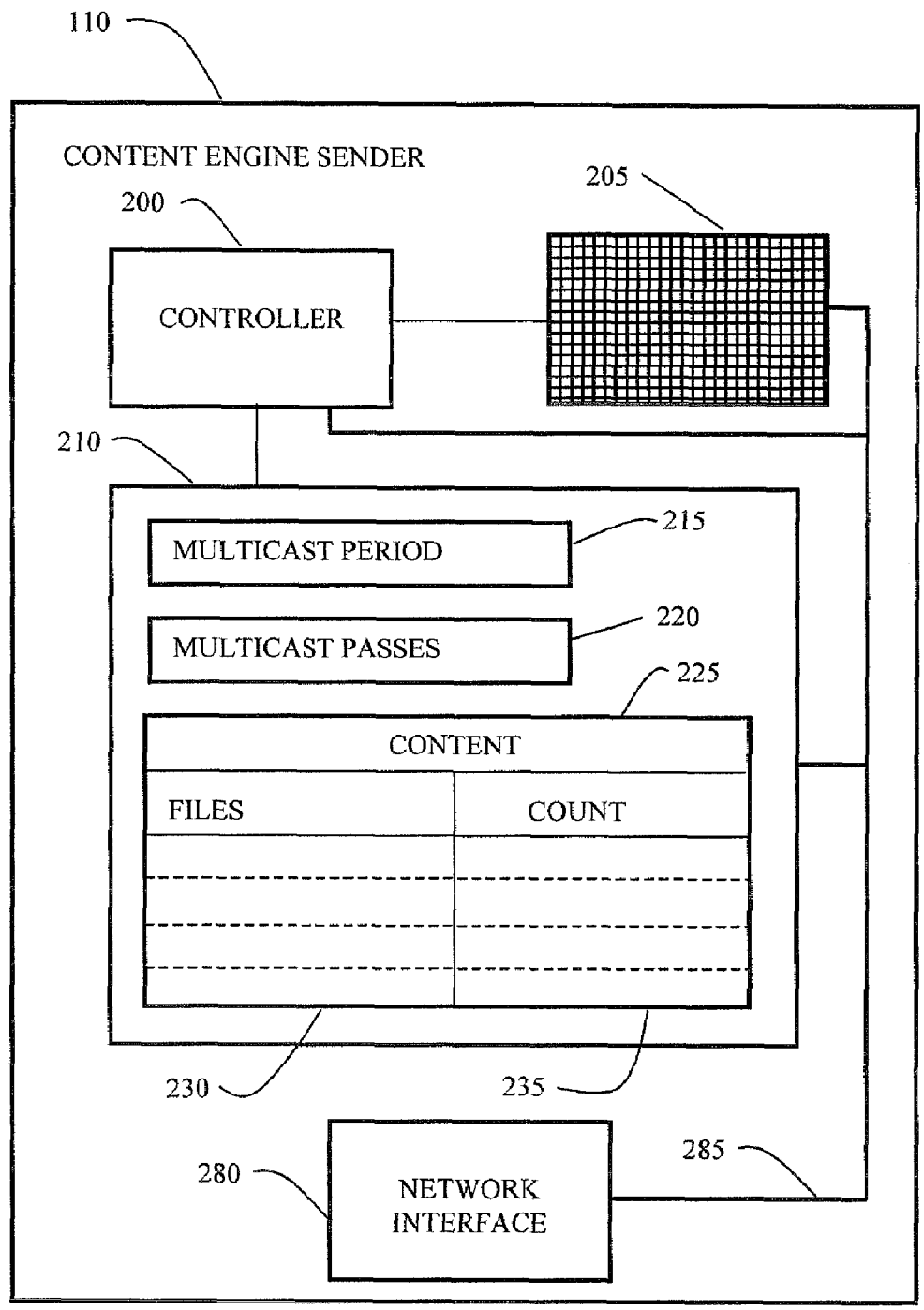
FIG. 2 is a block diagram of the content engine sender of FIG. 1.

FIG. 2 is a block diagram of a content engine sender such as the primary content engine sender 110 of FIG. 1. The content engine sender 110 includes a controller 200, a memory 205, a storage device 210, a network interface 280, and an interconnection mechanism 285. The interconnection mechanism 285 couples at least the controller 200, the memory 205, and the network interface 280, and may, in some embodiments, also couple the storage device 210 to the other elements. The storage device 210 stores the values of a multicast period 215 and a predetermined number of multicast passes 220. The storage device 210 further includes content data 225 to be distributed to the content engine receivers 120, 125, 130, 135. The content data 225 includes object identifiers and a count associated with each object. The multicast period 215 is the delay between each multicast pass after the first multicast message transmission. The multicast passes after the first transmission are not triggered until the content engine sender 110 receives a NACK 155 from one of the content engine receivers 120, 125, 130, 135. The multicast passes value 220 is the number of times that the sender 110 sends a file in the multicast message 145. Each file is sent only a predetermined number of times that is capped by the multicast passes value 220. In other words, the content engine sender 110 iterates through multicast passes on a per object basis. The multicast passes value is in place to prevent constant multicast transmission cycling caused by any lagging content engine receivers. The operation of the content engine receiver 110 will be described in more detail below.

Figure 3:
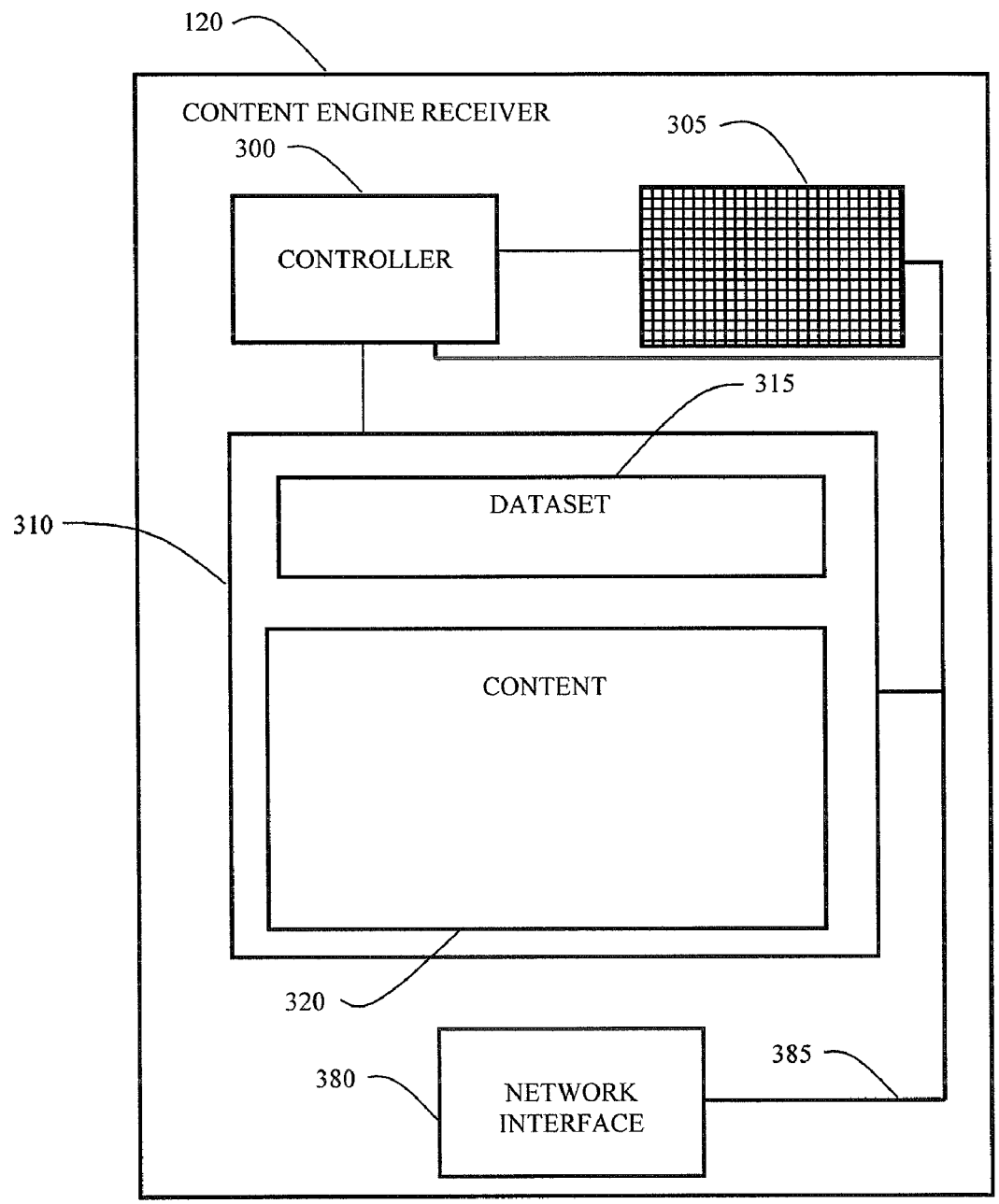
FIG. 3 is a block diagram of a content engine receiver of FIG. 1.

FIG. 3 is a block diagram of a content engine receiver of FIG. 1 such as content engine receiver 120. The content engine receiver 120 includes a controller 300, a memory 305, a storage device 310, a network interface 380, and an interconnection mechanism 385. The interconnection mechanism 285 couples at least the controller 300, the memory 305, and the network interface 380, and may, in some embodiments, also couple the storage device 310 to the other elements. The storage device includes a dataset 315 and content 320. The dataset 315 provides a listing of all objects that should be present in the content 320. Periodically, the content engine receiver 120 compares the dataset 315 to the content 320. If the content engine receiver 120 discovers that files are missing from the content 320 according to the dataset 315, the content engine receiver 120 generates a NACK 155 including a request for the missing files. The content engine receiver 120 sends the NACK 155 to the primary content engine sender 110. If after a waiting period, the content engine receiver 120 does not receive a response from the primary content engine sender 110, the content engine receiver 120 resends the NACK 155 but addresses it to the backup content engine sender 115. The NACK 155 sent to the backup content engine sender 115 activates failover processes in the CDN 100 as will be described below.

Figure 4:
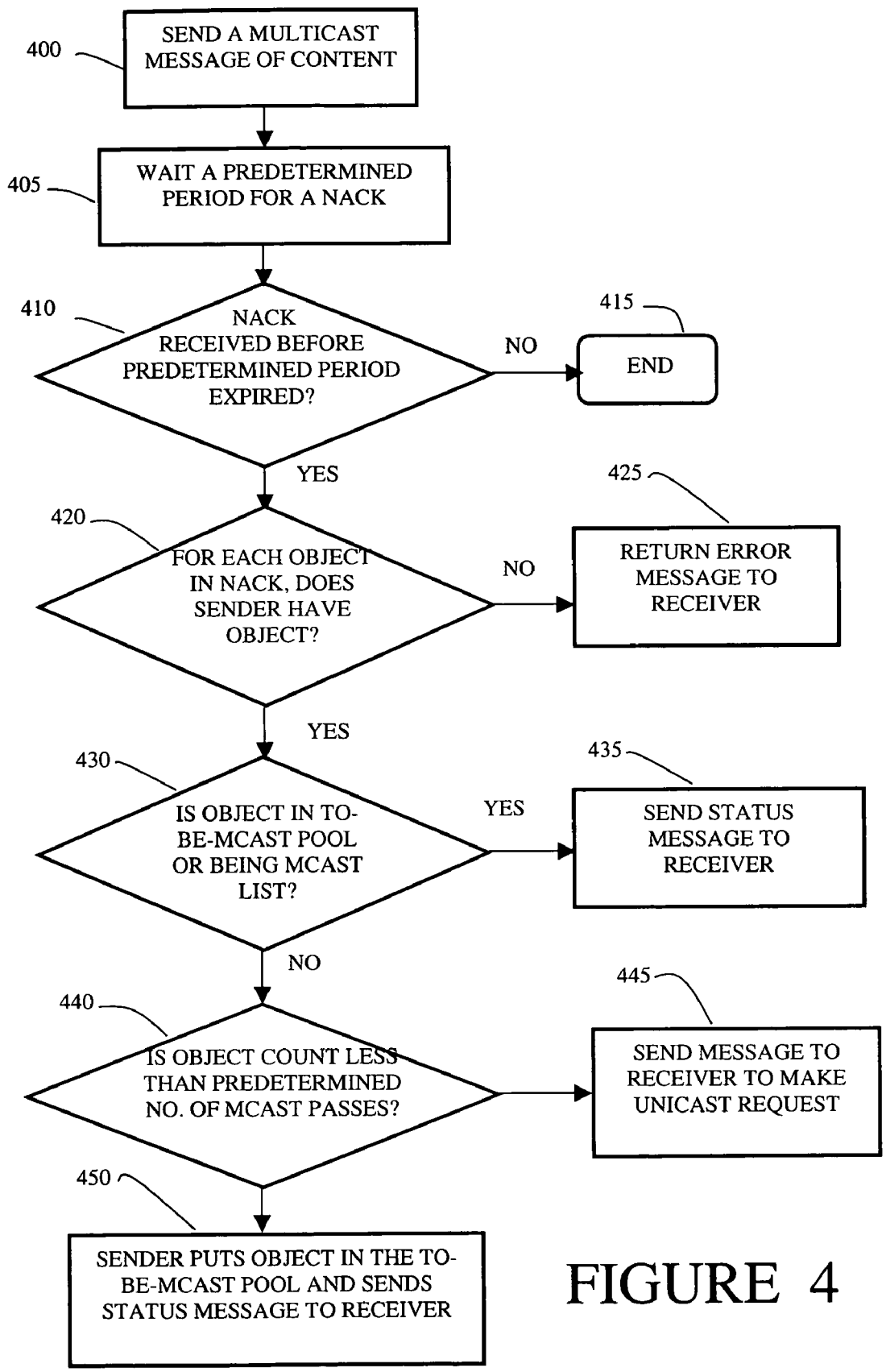
FIG. 4 is a flow chart of the operation of the primary content engine sender of FIG. 2.

FIG. 4 is a flow chart of the operation of the primary content engine sender according to the invention.

At step 400, the primary content engine sender 110 sends a multicast message 145 containing content to the content engine receivers 120, 125, 130, 135. The content in the multicast message 145 is a plurality of objects to be distributed in the CDN by the primary content engine sender 110 for availability to the client 140. The sender 110 initiates the per-object counter described above for each object in the multicast message 145. In one example embodiment of the invention, the sender 110 first puts the object in a to-be-multicast pool of objects. The sender 110 in this embodiment is able to multicast a preconfigured number of objects, N, simultaneously. The sender 110 moves objects from the to be multicast pool of objects to being-multicast list. The sender 110 creates and starts a multicast job to multicast the objects out to the receivers. Once the multicast job is complete, the sent objects are removed from the being-multicast list and the counts associated with each object are increased by one.

At step 405, the primary content engine sender 110 waits a predetermined period for NACKs 155 from the content engine receivers 120, 125, 130, 135. In one embodiment of the invention, the predetermined period is adjustable. The sender 110 in this embodiment is able to tell the receivers 120, 125, 130, 135 when to send a next NACK message based on the number of NACK messages that the sender 110 has already received. In a large network, the sender 110 generally tells the receivers 120, 125, 130, 135 to increase the predetermined period in order to avoid a NACK explosion in which a large number of NACKs is received potentially overwhelming the sender 110. In a small network, the sender 110 generally tells the receivers 120, 125, 130, 135 to decrease the predetermined period in order to improve response time.

At step 410, the primary content engine sender 110 determines whether A NACK has been received from one of the content engine receivers 120, 125, 130, 135. If the primary content engine 110 has received a NACK, the primary content engine 110 proceeds to step 420. If no NACK is received, the primary content engine 110 proceeds to step 415.

At step 415, the process for the multicast message sent in step 400 ends and the primary content engine sender 110 prepares for the next round of multicast messaging.

At step 420, the primary content engine sender 110 determines for each object in the received NACK 155 whether the sender 110 has that object. If the sender 110 has the object, then the sender 110 proceeds to step 430. If the sender 110 does not have the object, the sender 110 proceeds to step 425.

At step 425, the sender 110 returns an error message to the receiver that sent the NACK 155. The error message tells the receiver that the sender 110 does not have the object so that the receiver can do nothing and wait or the receiver can opt to do a unicast pull from another sender in the network.

At step 430, the primary content engine sender 110 determines if the object is in the to-be-multicast pool or in the being-multicast list. If the sender 110 finds the object in the to-be-multicast pool or in the being-multicast list, the sender 110 proceeds to step 435. If the sender 110 does not find the object in the to-be-multicast pool or in the being-multicast list, the sender 110 proceeds to step 440.

At step 435, the primary content engine sender 110 sends a status message to the receiver that sent the NACK 155. The status message tells the receiver to wait since the requested object is going to be multicast soon or is in the process of being multicasted.

At step 440, the primary content engine sender 110 determines whether the object's counter is less than the preconfigured number of multicast passes. If the counter exceeds the preconfigured number, the sender 110 proceeds to step 445. If the counter does not exceed the preconfigured number, the sender 110 proceeds to step 450.

At step 445, the primary content engine sender 110 sends a message to the receiver that sent the NACK 155 to request that the object be unicast.

At step 450, the primary content engine sender 110 puts the object in the to-be-multicast pool and sends a status message to the receiver. The status message tells the receiver to wait because the object the receiver requested will be sent soon.

Figure 5:
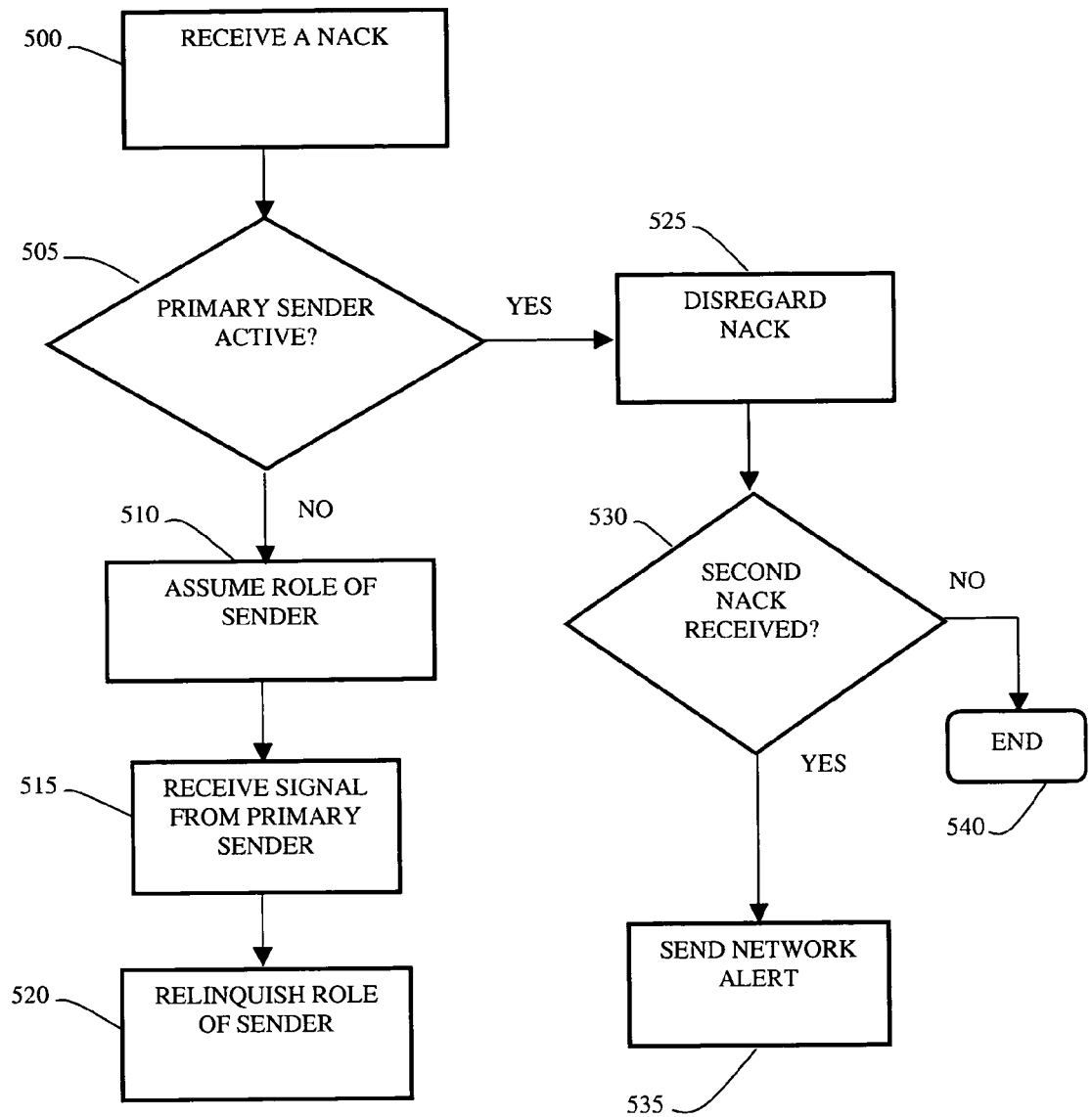
FIG. 5 is a flow chart of the operation of the backup content engine sender of FIG. 1.

FIG. 5 is a flow chart of the operation of the backup content engine sender according to principles of the invention.

At step 500, the backup content engine 115 receives a NACK 155. This indicates that the primary content engine 110 has not responded to the NACK 155 sent by one of the content engine receivers 120, 125, 130, 135.

At step 505, the backup content engine 115 determines whether the primary content engine sender 110 is active. If the primary content engine sender 110 is active, the backup content engine 115 proceeds to step 525. If the primary content engine sender 110 is not active, the backup content engine sender 115 proceeds to step 510.

At step 510, the backup content engine sender 115 assumes the role of sender to the select content engine receivers 120, 125, 130, 135 and executes the process of FIG. 4.

At step 515, the backup content engine sender 115 receives a signal from the recovered primary content engine sender 110.

At step 520, the backup content engine sender 115 finishes the tasks existing at the time that the signal was received from the primary content engine sender 110 and relinquishes the role of sender to the primary content engine sender 115.

At step 525, the backup content engine sender 115, having determined that the primary content engine sender 115 is active, disregards the received NACK 155 and proceeds to step 530.

At step 530, the backup content engine sender 115 determines whether a second NACK 115 is received. If a second NACK is received, the backup content engine sender 115 proceeds to step 535. If a second NACK is not received, the backup content engine sender 115 proceeds to step 540.

At step 535, the backup content engine sender 115 sends a network alert, typically to be detected by a system administrator. Generally, when the backup content engine sender 115 receives a NACK 155 when the primary content engine sender 110 is active, the received NACK 155 is an indicator that there is a network error.

At step 540, the process of the backup content engine sender 115 ends because the primary content engine sender 110 is active.

Figure 6:
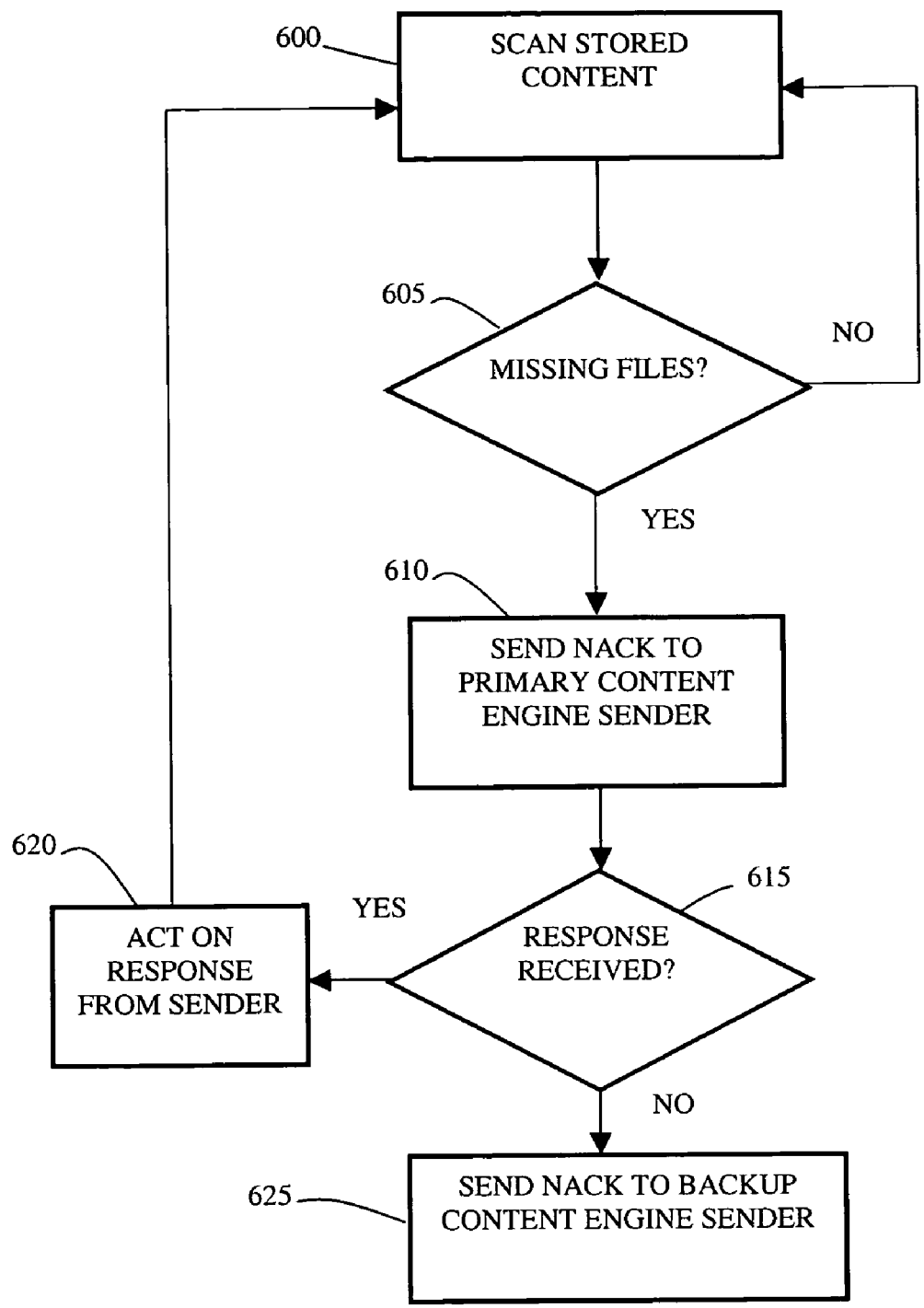
FIG. 6 is a flow chart of the operation of a content engine receiver of FIG. 1.

FIG. 6 is a flow chart of the operation of a content engine receiver according to principles of the invention.

At step 600, the content engine receiver 120 scans its content to determine whether there are files missing from the content.

At step 605, the content engine receiver 120 determines whether there are files missing from the content. The content engine receiver 120 typically determines that files are missing from the content by comparing the content 320 to the dataset 315. If the content engine receiver 120 determines that no files are missing, the content engine receiver 120 returns to step 600. If the content engine receiver 120 determines that files are missing, the content engine receiver 120 proceeds to step 610.

At step 610, the content engine receiver 120 sends a NACK 155 to the primary content engine sender 110. The NACK 155 includes a request for the files missing from the content 320.

At step 615, the content engine receiver 120 determines whether the primary content engine sender 110 has responded with a message including the missing files. If a response is received, the content engine receiver 120 proceeds to step 620. If a response is not received, the content engine receiver 120 proceeds to step 625.

At step 620, the content engine receiver 120 acts according to the response received from the sender 110. If the response from the sender 110 contains the files requested in the NACK 155, the receiver 120 adds the new files received in a message from the primary content engine sender 110 to the content 320. If the response from the sender 110 is a message to do nothing, the receiver 120 waits to receive the files in a later message from the sender 120. If the response from the sender 110 is a message to make a unicast request for a file, the receiver 120 generates a unicast request for the file.

At step 625, the content engine receiver 120 sends a NACK 155 to the backup content engine sender 115 to activate the backup system in the CDN.

The system described above provides reliable multicast to multicast fail-over without premature fail-over to unicast distribution. Further, the backup sender does not require synchronization with the primary sender making the operation of the primary sender more efficient while fail-over to the backup sender quick and reliable.

Other embodiments of the invention include a computer system, such as a data communications device, computerized device, or other device configured with software and/or circuitry to process and perform all of the method operations noted above and disclosed herein as embodiments of the invention. In such embodiments, the device, such as a data communications device comprises at least one communications interface (e.g., a network interface), a memory (e.g., any type of computer readable medium, storage or memory system), a processor and an interconnection mechanism connecting the communications interface, the processor and the memory. In such embodiments, the memory system is encoded with a reliable multicast distribution method that when performed on the processor, produces a process that causes the computer system to perform any and/or all of the method embodiments, steps and operations explained herein as embodiments of the invention. In other words, a computer, switch, router, gateway, network bridge, proxy device or other network device that is programmed or otherwise configured to operate as explained herein is considered an embodiment of the invention.

Other arrangements of embodiments of the invention that are disclosed herein include software programs to perform the method embodiment steps and operations summarized above and disclosed in detail below. As an example, a data communications device software control application, such as a data communications device operating system configured with a reliable multicast distribution system that operates as explained herein is considered an embodiment of the invention. More particularly, a computer program product is disclosed which has a computer-readable medium including computer program logic encoded thereon that, when executed on at least one processor with a computerized device, causes the processor to perform the operations (e.g., the methods) indicated herein is considered an embodiment of the invention. Such embodiments of the invention are typically embodied as software, logic instructions, code and/or other data (e.g., data structures) arranged or encoded on a computer readable medium such as an optical medium (e.g., CD-ROM), floppy or hard disk or other a medium such as firmware or microcode in one or more ROM or RAM or PROM chips or as an application. Specific. Integrated Circuit (ASIC). These software or firmware or other such configurations can be installed onto a computer system, data communications device or other dedicated or general purpose electronic device to cause such a device to perform the techniques explained herein as embodiments of the invention.

The embodiments of the invention may be implemented by computer software and/or hardware mechanisms within a data communications device apparatus. It is to be understood that the system of the invention can be embodied strictly as a software program, as software and hardware, or as hardware and/or circuitry alone. The features of the invention, as explained herein, may be employed in data communications devices and other computerized devices and/or software systems for such devices such as those manufactured by Cisco Systems, Inc. of San Jose, Calif.

It is to be understood that the above-described embodiments are simply illustrative of the principles of the invention. Various and other modifications and changes may be made by those skilled in the art which will embody the principles of the invention and fall within the spirit and scope thereof.

What is claimed is:

1. A method for distributing content in a content distribution network, the method occurring in a computerized device, the method comprising the steps of:
    sending a multicast message to a plurality of content engine receivers, the multicast message including content to be distributed among the plurality of content engine receivers;
    waiting a predetermined period for a negative acknowledgment message from at least one of the plurality of content engine receivers;
    if a negative acknowledgment message from at least one of the plurality of content engine receivers is received before expiration of a predetermined period, then resending the multicast message a predetermined number of times;
    receiving a second negative acknowledgment message from one of the plurality of content engine receivers after resending the multicast message the predetermined number of times; and
    sending a unicast message of content to be distributed in response to the second negative acknowledgment message to the one content engine receiver.

2. The method of claim 1 further comprising the steps of:
    receiving a negative acknowledgment message from one of the plurality of content engine receivers after the predetermined period has expired; and
    sending a unicast message of content to be distributed to the one content engine receiver in response to the negative acknowledgment message received after the predetermined period has expired.

3. The method of claim 1 wherein the step of sending further comprises the step of sending the multicast message in response to a negative acknowledgment message from at least one of the plurality of content engine receivers.

4. The method of claim 3 wherein the step of sending further comprises the steps of:
    contacting a primary content engine sender before sending the multicast message;
    sending the multicast message to the plurality of content engine receivers if the primary content engine does not respond to the contacting; and
    disregarding the negative acknowledgment if the primary content engine does respond to the contacting.

5. The method of claim 1 wherein the negative acknowledgment includes a request for at least one file not received in the multicast message, and wherein the step of resending the multicast message further comprises resending only the at least one file requested in the negative acknowledgment.

6. The method of claim 5 wherein a plurality of negative acknowledgments are received during the predetermined period, each negative acknowledgment including a request for at least one file not received in the multicast message, and wherein the step of resending the multicast message further comprises the steps of:
    aggregating the files requested in the plurality of negative acknowledgments; and
    resending the multicast message including the aggregated files.

7. The method of claim 1 wherein the multicast message includes a plurality of files, each file of the plurality having an associated count value, the associated count value indicating the number of times the file has been transmitted by the computerized device, the method further comprising the step of incrementing the associated count value each time the computerized device transmits a file.

8. The method of claim 7 wherein the negative acknowledgment includes a request for at least one file not received in the multicast message, and wherein the step of resending the multicast message further comprises resending the at least one file until the associated count for the at least one file equals the predetermined number.

9. A method for distributing content in a content distribution network, the method occurring in a computerized device, the method comprising the steps of:
   receiving a negative acknowledgment message from one of a plurality of content engine receivers;
   checking a primary content engine sender for status;
   if the primary content engine sender is active,
      a) disregarding the negative acknowledgment message; and
      b) if a second negative acknowledgment message is received, sending a network alert; and
   if the primary content engine sender is inactive, sending a multicast message to the plurality of content engine receivers in response to the negative acknowledgment message.

10. A method for maintaining content, the method occurring in a computerized device storing distributed content in a content distribution network, the method comprising the steps of:
   scanning the distributed content stored on the computerized device;
   if missing files are discovered in the scanning step, sending a negative acknowledgment message to a primary content sender requesting the missing files; and
   if a response to the negative acknowledgment is not received from the primary content sender, sending the negative acknowledgment message to a secondary content sender thereby triggering a backup system.

11. A content engine sender, comprising:
   means for sending a multicast message to a plurality of content engine receivers, the multicast message including content to be distributed among the plurality of content engine receivers;
   means for waiting a predetermined period for a negative acknowledgment message from at least one of the plurality of content engine receivers;
   means for if a negative acknowledgment message from at least one of the plurality of content engine receivers is received before expiration of a predetermined period, then resending the multicast message a predetermined number of times;
   means for receiving a second negative acknowledgment message from one of the plurality of content engine receivers after resending the multicast message the predetermined number of times; and
   means for sending a unicast message of content to be distributed in response to the second negative acknowledgment message to the one content engine receiver.

12. A computer program product, stored on computer-readable medium, including computer program logic that, when executed in a processor of a computer system, directs the computer system to perform operations of:
   sending a multicast message to a plurality of content engine receivers, the multicast message including content to be distributed among the plurality of content engine receivers;
   waiting a predetermined period for a negative acknowledgment message from at least one of the plurality of content engine receivers;
   if a negative acknowledgment message from at least one of the plurality of content engine receivers is received before expiration of a predetermined period, then resending the multicast message a predetermined number of times;
   receiving a second negative acknowledgment message from one of the plurality of content engine receivers after resending the multicast message the predetermined number of times; and
   sending a unicast message of content to be distributed in response to the second negative acknowledgment message to the one content engine receiver.

13. A computerized device for distributing content in a content distribution network comprising:
   a processor;
   a memory;
   a network interface;
   an interconnection mechanism coupling the processor, the memory and the network interface;
   wherein the memory is encoded with logic that when executed by the processor as a process, causes the computerized device to perform the operations of:
   sending a multicast message, via the network interface, to a plurality of content engine receivers, the multicast message including content to be distributed among the plurality of content engine receivers;
   waiting a predetermined period for a negative acknowledgment message, received on the network interface from at least one of the plurality of content engine receivers;
   if a negative acknowledgment message from at least one of the plurality of content engine receivers is received before expiration of a predetermined period, then resending the multicast message a predetermined number of times via the network interface;
   receiving a second negative acknowledgment message from one of the plurality of content engine receivers after resending the multicast message the predetermined number of times; and
   sending a unicast message of content to be distributed in response to the second negative acknowledgment message to the one content engine receiver.

14. The computerized device of claim 13 wherein the logic further causes the computerized device to perform the operations of:
   receiving a negative acknowledgment message from one of the plurality of content engine receivers after the predetermined period has expired; and
   sending a unicast message of content to be distributed to the one content engine receiver in response to the negative acknowledgment message received after the predetermined period has expired.

15. The computerized device of claim 13 wherein when the logic causes the computerized device to perform the operation of sending, the logic causes the computerized device to perform the operation of sending the multicast message in response to a negative acknowledgment message from at least one of the plurality of content engine receivers.

16. The computerized device of claim 15 wherein when the logic causes the computerized device to perform the operation of sending, the logic causes the computerized device to perform the operations of:
   contacting a primary content engine sender before sending the multicast message;
   sending the multicast message to the plurality of content engine receivers if the primary content engine does not respond to the contacting; and
   disregarding the negative acknowledgment if the primary content engine does respond to the contacting.

17. The computerized device of claim 13 wherein the negative acknowledgment includes a request for at least one file not received in the multicast message, and wherein when the logic causes the computerized device to perform the operation of resending, the logic causes the computerized device to perform the operation of resending only the at least one file requested in the negative acknowledgment.

18. The computerized device of claim 17 wherein a plurality of negative acknowledgments are received during the predetermined period, each negative acknowledgment including a request for at least one file not received in the multicast message, and wherein when the logic causes the computerized device to perform the operation of resending the multicast message, the logic causes the computerized device to perform the operations of:
   aggregating the files requested in the plurality of negative acknowledgments; and
   resending the multicast message including the aggregated files.

19. The computerized device of claim 13 wherein the multicast message includes a plurality of files, each file of the plurality having an associated count value, the associated count value indicating the number of times the file has been transmitted by the computerized device, and wherein the logic causes the computerized device to perform the operation of incrementing the associated count value each time the computerized device transmits a file.

20. The computerized device of claim 19 wherein the negative acknowledgment includes a request for at least one file not received in the multicast message, and wherein when the logic causes the computerized device to perform the operation of resending the multicast message further, the logic causes the computerized device to perform the operation of resending the at least one file until the associated count for the at least one file equals the predetermined number.

21. A computerized device for distributing content in a content distribution network, the computerized device comprising:
   a processor;
   a memory;
   a network interface;
   an interconnection mechanism coupling the processor, the memory and the network interface;
   wherein the memory is encoded with logic that when executed by the processor, performs operations of:
   receiving, via the network interface, a negative acknowledgment message from one of a plurality of content engine receivers;
   checking a primary content engine in the memory sender for status;
   if the primary content engine sender is active,
      a) disregarding the negative acknowledgment message received via the network interface; and
      b) if a second negative acknowledgment message is received via the network interface, sending a network alert via the network interface; and
   if the primary content engine sender is inactive, sending a multicast message via the network interface to the plurality of content engine receivers in response to the negative acknowledgment message.

22. A computerized device storing distributed content in a content distributed network, the computerized device comprising:
   a processor;
   a memory;
   a storage area;
   a network interface;
   an interconnection mechanism coupling the processor, the memory and the network interface and the storage area;
   wherein the memory is encoded with logic for maintaining content in a storage area, the logic, when executed by the processor, performs operations of:
   scanning the distributed content stored on the computerized device in the storage area;
   if missing files are discovered in the scanning operation, sending, via the network interface, a negative acknowledgment message to a primary content sender requesting the missing files; and
   if a response to the negative acknowledgment is not received from the primary content sender via the network interface, sending, via the network interface, the negative acknowledgment message to a secondary content sender thereby triggering a backup system.

23. A device for distributing content in a content distribution network, comprising;
   a memory;
   a storage device to store a multicast period and a threshold number of multicast passes;
   the storage device further to store content to be distributed in the content distributed network; and
   a controller in communication with the memory and the storage device, the controller acting with the memory to control the device, the controller configured to send multicast message to a plurality of content engine receivers, the multicast message to include at least a portion of the content, the controller further configured to wait the multicast period for a negative acknowledgment message from at least one of the plurality of content engine receivers, the controller further configured to resend the multicast message the threshold number of multicast passes if a negative acknowledgement message is received before expiration of the multicast period, the controller further configured to send a unicast message in response to a second negative acknowledgment message received after the multicast message is sent the threshold number of multicast passes.

24. The device of claim 23 wherein the controller is further configured to send a unicast message in response to a second negative acknowledgment message received after expiration of the multicast period.

* * * * *